United States Patent
Bouwer

(10) Patent No.: US 12,241,133 B2
(45) Date of Patent: Mar. 4, 2025

(54) PROCESS FOR THE SMELTING OF A METALLIFEROUS FEEDSTOCK MATERIAL

(71) Applicant: African Rainbow Minerals Limited, Johannesburg (ZA)

(72) Inventor: Petrus Hendrik Ferreira Bouwer, Fairland (ZA)

(73) Assignee: African Rainbow Minerals Limited, Johannesburg (ZA)

(*) Notice: Subject to any disclaimer, the term of this patent is extended or adjusted under 35 U.S.C. 154(b) by 627 days.

(21) Appl. No.: 17/608,707

(22) PCT Filed: May 11, 2020

(86) PCT No.: PCT/IB2020/054424
§ 371 (c)(1),
(2) Date: Nov. 3, 2021

(87) PCT Pub. No.: WO2020/229994
PCT Pub. Date: Nov. 19, 2020

(65) Prior Publication Data
US 2022/0220572 A1 Jul. 14, 2022

(30) Foreign Application Priority Data
May 10, 2019 (NL) ..................................... 2023109

(51) Int. Cl.
*C21B 13/00* (2006.01)
*C21B 13/14* (2006.01)

(52) U.S. Cl.
CPC ........ *C21B 13/002* (2013.01); *C21B 13/0033* (2013.01); *C21B 13/0073* (2013.01); *C21B 13/0093* (2013.01); *C21B 13/143* (2013.01)

(58) Field of Classification Search
CPC .............. C21B 13/002; C21B 13/0033; C21B 13/0073; C21B 13/0093; C21B 13/143; C21B 11/10; Y02P 10/134
(Continued)

(56) References Cited

U.S. PATENT DOCUMENTS 3,033,673 A   5/1962  Fredrik et al.
3,832,158 A * 8/1974  Obenchain ............ C21B 13/002
                                              75/499
(Continued)

FOREIGN PATENT DOCUMENTS

CN       103060503 A      4/2013
WO    WO 01/20046 A1 *    3/2001   ............... C21B 7/22

OTHER PUBLICATIONS

Mpa, Electric arc furnace carbon steel slag (EAF) (Year: 2024).*
(Continued)

*Primary Examiner* — Brian D Walck
*Assistant Examiner* — Danielle Carda
(74) *Attorney, Agent, or Firm* — Schwabe, Williamson & Wyatt P.C.

(57) ABSTRACT

The present invention relates to a process for the smelting of a metalliferous feedstock material. The process includes the steps of: (i) feeding an agglomerate comprising of a fine metalliferous feedstock material and a fine reductant to a reactor, the agglomerate forming a packed bed within the reactor; (ii) smelting the agglomerate by passing a hot reducing gas counter current through the packed bed to form a molten material comprising a partially reduced metalliferous constituent, an intermediate slag constituent and entrained unreacted reductant constituent; and (iii) channeling the molten material to flow into a vessel to form a metal product and a slag product.

20 Claims, 1 Drawing Sheet

(58) Field of Classification Search
USPC .......................................................... 75/492
See application file for complete search history.

(56) References Cited

U.S. PATENT DOCUMENTS 6,428,603 B1 8/2002 Batterham
2002/0050188 A1 5/2002 Dry et al.

OTHER PUBLICATIONS

WIPO Application No. PCT/IB2020/054424, PCT Written Opinion of the International Searching Authority mailed Jun. 22, 2020.
WIPO Application No. PCT/IB2020/054424, PCT International Preliminary Report on Patentability Apr. 16, 2021.
WIPO Application No. PCT/IB2020/054424, PCT International Search Report of the International Searching Authority mailed Jun. 22, 2020.

* cited by examiner

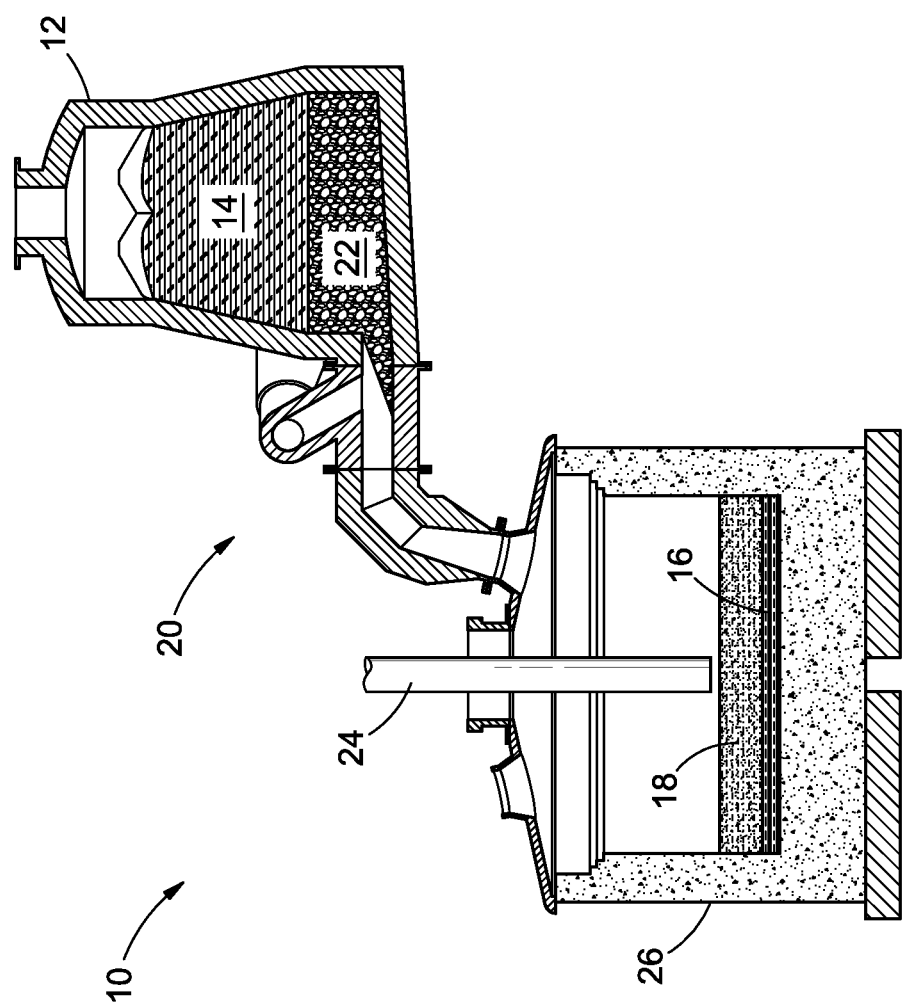

PROCESS FOR THE SMELTING OF A METALLIFEROUS FEEDSTOCK MATERIAL

CROSS-REFERENCE TO RELATED APPLICATIONS

This Application is a US National Stage Application under 35 USC § 371 of PCT/IB2020/054424, filed May 11, 2020, which claims the benefit of The Netherlands Patent Application No. 2023109, filed May 10, 2019, each of which is herein incorporated by reference in its entirety.

FIELD OF THE INVENTION

The present invention relates to a process for the smelting of a metalliferous feedstock material.

BACKGROUND TO THE INVENTION

Direct reduction processes have come into increasing prominence in recent years. Direct reduction indicates a process whereby metal oxides in the ore, as the feed material, are reduced while the ore is still in the solid state. In conventional processes, reduced metal oxides are transferred from the direct reduction process to a subsequent smelting process wherein the reduced metal oxides are metallized, smelting referring to the reduction and melting of the feed.

It will be appreciated that the reduced metal oxides will cool down significantly whilst being transferred from the direct reduction process to the smelting process. The aforementioned cooling of the reduced metal oxides results in significant energy losses as the reduced metal oxides would have to be reheated during the smelting process.

A further disadvantage associated with conventional direct reduction processes and process equipment is that a directly reduced product can only be handled if same remains in the solid state.

U.S. Pat. No. 3,033,673 entitled "Process of reducing iron oxides" discloses a direct reduction process whereby a metal iron oxide in an agglomerate is reduced in the solid state. This solid-state reduction process occurs in the shaft furnace disclosed in the patent. The patent continues to provide that the partially reduced metal oxide is smelted (i.e. melted) in an electric furnace. In other words, neither the agglomerates nor the metal oxides in the agglomerates are melted in the shaft furnace.

Melting of the metal oxides result in, amongst other things, equipment blockages, reduced energy transfer and a decrease in process (i.e. reduction) efficiency.

This disadvantage is exemplified in the known commercial scale processes. The first example is direct reduction technology developed by Showa Denko for the direct reduction of chrome ore in rotary kilns at up to 1400° C. This temperature limitation in the process is to ensure that liquid phase build up is prevented in the kiln, otherwise the process will stop. In the Showa Denko process, the directly reduced product must be allowed to cool down to allow mechanical transfer to a final electrical smelting furnace, with the temperature of the product dropping down to typically 600° C. during transfer.

As a further example, Kobe Steel and Midrex developed a FastSmelt process where composite agglomerates of iron ore can be directly reduced in a rotary hearth furnace making use of combusted pulverised coal. The agglomerates in the FastSmelt process again need to stay in the solid state so that they can be removed from the rotary hearth.

The next development from Kobe Steel and Midrex was the ITMK3 process whereby iron nuggets are allowed to form inside the agglomerates at higher operating temperatures, but the same limitation persist in that the agglomerates need to remain in solid state in order to allow removal from the rotary hearth. The nuggets are then melted in a subsequent process after cooling down and being transferred from the rotary hearth, resulting in significant energy losses. This development has not been a commercial success due to equipment challenges.

Further to the above disadvantages, it is to be appreciated that a further disadvantage in the known processes is that the temperature required for allowing metal oxides to be metallized cannot be effectively controlled. This is due to the fact that very high temperature zones need to be created in order for the processes to work. Examples of such known commercial scale processes are submerged arc furnaces and blast furnaces, and these are the only processes used to date to produce alloys such as ferromanganese and ferrochrome commercially. The lack of effective temperature control in these processes results in impurities being reduced to the product alloy, such as Si, Mn and S, in these high temperature zones, which impurities act to contaminate the final product.

U.S. Pat. No. 3,832,158 entitled "Process for producing metal from metal oxide pellets in a cupola type vessel" is known to the applicant. This patent describes a process whereby agglomerates containing a metal oxide are smelted (i.e. melted) using heat generated during the combustion of a coke bed. It is well-known that coke is extremely expensive and often renders the large-scale smelting of metal oxides to be less competitive.

OBJECT OF THE INVENTION

It is accordingly an object of the present invention to provide a novel process for the smelting of a metalliferous feedstock material which overcomes, at least partially, the abovementioned disadvantages and/or which will be a useful alternative to existing processes for the smelting of a metalliferous feedstock material while allowing for the handling of reduced products in the molten state.

SUMMARY OF THE INVENTION

According to the invention, there is provided a process for the smelting of a metalliferous feedstock material, the process including the steps of:
 (i) feeding an agglomerate comprising of fine a metalliferous feedstock material and a fine reductant to a reactor, the agglomerate forming a packed bed within the reactor;
 (ii) smelting the agglomerate by passing a hot reducing gas counter current through the packed bed to form a molten material comprising a partially reduced metalliferous constituent, an intermediate slag constituent and entrained unreacted reductant constituent; and
 (iii) channeling the molten material to flow into a vessel to form a metal product and a slag product.

In the current context, reference to fine in relation to particle size is a particle size of less than or equal to 6 mm, but preferably less than 75 μm.

The vessel may be separate from and in fluid flow communication with the reactor.

The process may include the additional step of adding electrical energy to the molten material in the vessel to reduce the partially reduced metalliferous constituent further to form an optimised liquid metal product and a final slag product, the entrained unreacted reductant constituent in the molten material serving as the reducing agent. In this manner, a high degree of metallization of the partially reduced metalliferous constituent can be obtained. The degree of metallization of the metalliferous feedstock material in the process may be up to 98%. The entrained unreacted reductant constituent in the slag allows for a much higher reduction of the metalliferous constituent compared to conventional smelting processes.

The addition of electrical energy to the molten material may be controlled to adjust the temperature of the molten material to form the optimised liquid metal product and the final slag product, the optimised liquid metal product and the final slag product being suitable for tapping from the vessel.

The entrained unreacted reductant constituent in the molten material may allow for the complete reduction of the partially reduced metalliferous constituent present in the molten material.

The composition of the agglomerates may be manipulated to lower the melting temperature of the agglomerates in the packed bed to thereby increase the melting rate of the agglomerates and decrease the degree of reduction of the fine metalliferous feedstock material.

The composition of the agglomerates may be manipulated to increase the melting temperature of the agglomerates in the packed bed to thereby decrease the melting rate of the agglomerates and increase the degree of reduction of the fine metalliferous feedstock material.

The hot gas should be a reducing gas with a $CO/CO_2$ ratio greater than 5 and preferably greater than 10 so as to avoid re-oxidation of metalliferous constituent.

The hot reducing gas may be passed through the packed bed at a temperature above 1200° C., preferably above 1350° C. and most preferably above 1600° C., the temperature being dependent on the metal product being produced.

The packed bed may include a fluid permeable interface at an operatively downstream position relative to a region where the agglomerate is fed to the reactor, the fluid permeable interface permitting the hot reducing gas to pass therethrough and through the packed bed of agglomerates. The fluid permeable interface may be an operatively base region of the packed bed in the reactor.

The packed bed may be suspended by side walls of the reactor at a position at which the direction of the side walls changes.

Alternatively, the packed bed may be suspended by an obstruction located in the reactor, the obstruction being at an operatively downstream position relative to the region where the agglomerate is fed to the reactor. The obstruction may be a permeable bed of refractories. Alternatively, the obstruction may be a permeable bed of coke particles.

The agglomerate may include a flux. A flux may be fed together with, but separately from, the agglomerates into the reactor.

The agglomerate may include a binding agent.

There is provided for the process to include the additional step of adding additional reductant to the molten material in the vessel.

There is provided for the electrical energy to be added to the molten material via electrodes in the vessel which are submerged in the molten material.

The optimised liquid metal product and the final slag product may be formed via an electrochemical reaction between the partially reduced metalliferous constituent and the unreacted entrained reductant constituent in the molten material, the intermediate slag constituent serving as an electrolyte. In this manner, a very high degree of metallization of the metalliferous feedstock material, such as metal oxides, can be achieved compared to the known prior art processes, wherein the degree of metallization achieved through the process of the present invention may be up to 98%.

The residence time of the metalliferous feedstock material in the packed bed of agglomerates may be controlled to impact the degree of reduction of the metalliferous feedstock material in the reactor.

The operating temperatures in the reactor and vessel may be controlled to selectively metalize a first target metal in the metalliferous feedstock material, thereby allowing the metalized first target metal to report to the optimised liquid metal product and the non-target metals to report to the final slag product.

There is provided for the final slag product to be provided as the metalliferous feedstock material in a subsequent process, the subsequent process being a processes according to the invention, and wherein the operating temperatures in the reactor and vessel in the subsequent process is controlled to selectively metallize a second target metal in the metalliferous feedstock material, thereby allowing the metalized second target metal to report to the liquid metal product of the subsequent process and the remaining non-target metals to report to the final slag product of the subsequent process.

The final slag product generated may be transferred for further processing.

The temperature of the hot reducing gas may be set at a targeted temperature.

The electrical energy input may be controlled to achieve a targeted liquid metal product and final slag product temperature.

BRIEF DESCRIPTION OF THE DRAWING

An embodiment of the invention is described below, by way of a non-limiting example only and with reference to the accompanying drawing in which:

FIG. 1 is a schematic diagram of the process of the present invention.

DETAILED DESCRIPTION OF THE INVENTION

With reference to the accompanying drawing, in which like numerals refer to like features, a process for the smelting of a metalliferous feedstock material according to the invention is generally designated by reference number 10.

The process for the smelting of a metalliferous feedstock material 10 includes the steps of:

(i) feeding an agglomerate (not shown) comprising of a fine metalliferous feedstock material (not shown) and a fine reductant (not shown) to a reactor 12, the agglomerate forming a packed bed 14 within the reactor 12;

(ii) smelting the agglomerate (not shown) by passing a hot reducing gas counter current through the packed bed to form a molten material (not shown) comprising a partially reduced metalliferous constituent (not shown), an intermediate slag constituent (not shown) and entrained unreacted reductant constituent (not shown); and (iii) channeling the molten material to flow into a vessel 26 to form a liquid metal product 16 and a final slag product 18.

Typically, the metalliferous feedstock material is a mined metal oxide. However, the metalliferous feedstock material may be any material containing a metal oxide.

The agglomerate is fed gravitationally to the reactor 12 to form a fluid permeable packed bed 14 of agglomerates. The packed bed 14 of agglomerates is stacked between 2 and 3 metres high in the reactor 12. Ideally, the agglomerate has a diameter of between 10 mm and 20 mm, but the process 10 can accommodate agglomerates with a diameter of anything between 2 mm and 80 mm and even more. It is an advantage of the process 10, owing to, amongst other things, the low height of the packed bed 14 in the reactor 12, that agglomerates with limited strength and therefore limited, or no binder content can be utilised. The metalliferous feedstock material is dispersed within the agglomerate and is preferably a fine material having a particle size of less than 75 μm. It will be appreciated that the agglomerates may include a binder or binding agent, and the use or disuse of binder or binding agent would depend on the size of the agglomerate used in the process 10 and/or the height at which the packed bed 14 of agglomerates is stacked in the reactor 12. Furthermore, the agglomerate may include a flux or fluxing agent.

In this example, the agglomerates in the packed bed 14 are smelted by passing a hot reducing gas (not shown) therethrough in a counter current fashion. The hot reducing gas is fed to the reactor 12 at an operatively downstream position 20 of the packed bed 14 of agglomerates and counter current to the direction in which agglomerates are fed to the reactor 12. The hot reducing gas is fed to the reactor 12 at a velocity of between 3 and 4 m/s so that the hot reducing gas permeates through the packed bed 14 of agglomerates. The temperature of the hot reducing gas is controlled to be above 1300° C. and up to 1700° C., depending on the type of metalliferous feedstock material in the agglomerate and the extent of the reduction of the metalliferous feedstock material desired in the packed bed 14 of agglomerates.

By way of example, the hot reducing gas will be fed to the reactor 12 at a lower temperature when the metalliferous feedstock material is an iron-oxide than in an instance where the metalliferous feedstock material is a chrome-oxide. Importantly, the temperature of the hot reducing gas for smelting of iron-oxides can be set lower than the temperature at which silica-oxides and sulphides would be reduced, which will ensure a high purity pig iron being produced. The hot reducing gas is typically synthesis gas and preferably has a carbon monoxide to carbon dioxide ($CO/CO_2$) ratio greater than 10, preferably 15. As the hot reducing gas pervades through the packed bed 14 of agglomerates, the metalliferous feedstock material is partially reduced towards its metallic form. Here, the $CO/CO_2$ ratio of the synthesis gas is controlled to prevent re-oxidation of the reduced metalliferous feedstock material in the packed bed 14 of agglomerates and reactor 12.

In addition to partially reducing the metalliferous feedstock material in the agglomerates, the hot reducing gas melts the agglomerate, thereby forming a molten material comprising of a partially reduced metalliferous constituent, an intermediate slag constituent and entrained unreacted reductant constituent; the entrained unreacted reductant constituent emanates from the agglomerate. An advantage of the process of the invention is that the melting temperature of the agglomerate can be controlled. Control over the melting temperature of the agglomerate results in control over the residence time of the metalliferous feedstock material in the reactor 12; i.e. the rate at which the formed molten material flows out of the packed bed 14 is controlled. In turn, control over the residence time of the metalliferous feedstock material in the reactor 12 results in control over the degree of reduction of the metalliferous feedstock material taking place in the reactor.

A further significant advantage of the present invention is that by controlling or manipulating the composition of the agglomerates the melting temperature of the agglomerates can be controlled or manipulated. Thus, the rate of smelting of the agglomerate and the degree of reduction of the fine metalliferous feedstock material in the reactor 12 can be controlled. For example, by lowering the melting temperature of the agglomerate the rate of smelting of the agglomerate is increased and the degree of reduction of the metalliferous feedstock material is decreased in the reactor 12. In turn, by increasing the melting temperature of the agglomerate the rate of smelting of the agglomerate is decreased and the degree of reduction of the metalliferous feedstock material is increased in the reactor 12. It will be appreciated that the afore steps will determine the residence time of the agglomerate and metalliferous feedstock material containing metal oxides in the reactor 12. Therefore, the degree to which the metal oxides present in the agglomerates are reduced can be controlled, which is useful to optimise profitability.

The melting temperature of the agglomerate is controlled by a number of physical and chemical characteristics of the agglomerate and its constituents. For example, the melting temperate of the agglomerate can be increased by adding a flux or a fluxing agent thereto. The nature or type of metalliferous feedstock material would also influence the melting temperature of the agglomerate; i.e. all else being equal, an agglomerate containing iron-oxide would melt at a lower temperate than an agglomerate containing chromium-oxide.

Consequently, the residence time of the agglomerate in the reactor and thereby the degree of reduction of the metalliferous feedstock material may be controlled, depending on any one or a combination of the following:

the melting temperature of the metalliferous feedstock material and/or agglomerate, which is controlled by:
  i. the amount and nature of the flux or fluxing agent added to the agglomerate;
  ii. the amount and nature of the binder or binding agent added to the agglomerate; and
  iii. the selection of the ore types.
the temperature at which the hot reducing gas is fed to the packed bed 14 of agglomerates; and
the size of the agglomerates.

A fluid permeable interface is formed at an operatively lower region of the packed bed 14. The fluid permeable interface allows: (i) the hot reducing gas to pass therethrough and into the packed bed 14 of agglomerates and (ii) the molten material to flow out of and away from the packed bed 14 of agglomerates. In the embodiment shown in FIG. 1, the fluid permeable interface is formed adjacent to an obstruction 22 located in the reactor 12. The obstruction 22 of FIG. 1 takes the form of a porous bed of refractories. However, the obstruction 22 may also take the form of a porous bed of coke particles.

The pressure-drop of the hot reducing gas across the permeable fluid interface and packed bed 14 of agglomerates is minimized and typically in the order of 5 to 10 kPa. The temperature of the hot reducing gas, after having passed through the permeable bed 14 of agglomerates, is typically less than 300° C.

Having passed through the fluid permeable interface and from the packed bed 14 of agglomerates and to the vessel 26, electrical energy is added to the molten material. By adding electrical energy to the molten material, the partially reduced metalliferous constituent in the molten material is metallized and an optimised liquid metal product 16 and a final concentrated slag product 18 are formed. Electrical energy is added to the molten material via an electrode or electrodes 24 which is/are submerged in the molten material.

The optimised liquid metal and final slag products are, in an embodiment of the invention, formed via an electrochemical reaction between the partially reduced metalliferous constituent and the entrained unreacted reductant constituent, the intermediate slag serving as an electrolyte. This allows the metallisation to proceed to much higher levels compared to conventional smelting as known in the art.

Advantageously, the vessel 26 is in fluid flow communication with the reactor 12, thereby minimising heat loss during transfer of the molten material from the partial reduction reaction and melting to the electrochemical reaction. Furthermore, additional reductant (not shown) may be added to the molten material prior to or whilst subjecting same to the electrochemical reaction.

A major breakthrough achieved in the process 10 of the present invention is that it allows for the processing of the ores with hot synthesis gas while further allowing the products to melt and having a process design that can transfer the molten material to a further vessel for producing a liquid metal product and final slag product. The process 10 of the present invention thereby shows that, contrary to the perception of people skilled in the art that ores like chrome and manganese cannot be smelted by commercially produced hot gasses, these ores can in fact be smelted through use of such gasses using the process 10 of the present invention.

The process 10 of the present invention further provides the major advantage that the process reaction temperatures can be controlled at a required temperature, this in turn allows a metal constituent to be reduced to be targeted at a selected temperature whilst avoiding reduction of impurities which are present.

It will be appreciated by those skilled in the art that the invention is not limited to the precise details as described herein and that many variations are possible without departing from the scope of the invention. As such, the present invention extends to all functionally equivalent processing equipment, structures, methods and uses that are within its scope. In particular, the steps of the process provided for need not necessarily be executed sequentially. Furthermore, it is envisaged that the steps of the process provided for need not necessarily be executed in the order listed herein.

The description is presented by way of example only in the cause of providing what is believed to be the most useful and readily understood description of the principles and conceptual aspects of the invention. In this regard, no attempt is made to show structural details of the invention and/or the equipment utilised therein in more detail than is necessary for a fundamental understanding of the invention. The words which have been used herein are words of description and illustration, rather than words of limitation.

The invention claimed is:

1. A process for the smelting of a metalliferous feedstock material, the process including the steps of:
   (i) feeding an agglomerate comprising of a fine metalliferous feedstock material and a fine reductant to a reactor, the agglomerate forming a packed bed within the reactor;
   (ii) smelting the agglomerate by passing a hot reducing gas counter current through the packed bed to form a molten material comprising a partially reduced metalliferous constituent, an intermediate slag constituent and entrained unreacted reductant constituent, wherein the hot reducing gas has a $CO/CO_2$ ratio of higher than 5; and
   (iii) channeling the molten material to flow into a vessel to form a metal product and a slag product, the vessel being separate from and in fluid flow communication with the reactor.

2. The process of claim 1, wherein the process includes the additional step of adding electrical energy to the molten material in the vessel to reduce the partially reduced metalliferous constituent further to form an optimized liquid metal product and a final slag product, the entrained unreacted reductant constituent in the molten material serving as the reducing agent.

3. The process of claim 2, wherein the addition of electrical energy to the molten material is controlled to adjust the temperature of the molten material to form the optimized liquid metal product and the final slag product, the optimized liquid metal product and the final slag product being suitable for tapping from the vessel.

4. The process of claim 2, wherein electrical energy is added to the molten material to completely reduce the partially reduced metalliferous constituent present in the molten material.

5. The process of claim 2, including the additional step of adding additional reductant to the molten material in the vessel.

6. The process of claim 2, wherein electrical energy is added to the molten material via electrodes which are submerged in the molten material.

7. The process of claim 2, wherein the optimized liquid metal product and the final slag product are formed via an electrochemical reaction between the partially reduced metalliferous constituent and the unreacted entrained reductant constituent in the molten material, the intermediate slag constituent serving as an electrolyte.

8. The process of claim 2, wherein operating temperatures in the reactor and vessel is controlled to selectively metallize a first target metal in the metalliferous feedstock material, thereby allowing the metalized first target metal to report to the optimized liquid metal product and the non-target metals to report to the final slag product.

9. The process of claim 2, wherein the final slag product is provided as the metalliferous feedstock material in a subsequent process, wherein the operating temperatures in the reactor and vessel in the subsequent process is controlled to selectively metallize a second target metal in the metalliferous feedstock material, thereby allowing the metalized second target metal to report to the liquid metal product of the subsequent process and the remaining non-target metals to report to the final slag product of the subsequent process.

10. The process of claim 9, wherein the final slag product generated is transferred for further processing.

11. The process of claim 2, wherein the electrical energy input is controlled to achieve a targeted liquid metal product and final slag product temperature.

12. The process of claim 1, wherein the composition of the agglomerates is manipulated to lower the melting temperature of the agglomerates in the packed bed, to thereby increase the melting rate of the agglomerates and decrease the degree of reduction of the fine metalliferous feedstock material.

13. The process of claim 1, wherein the composition of the agglomerates is manipulated to increase the melting temperature of the agglomerates in the packed bed, to thereby decrease the melting rate of the agglomerates and increase the degree reduction of the fine metalliferous feedstock material.

14. The process of claim 1, wherein the hot reducing gas has a $CO/CO_2$ ratio of higher than 10.

15. The process of claim 1, wherein the hot reducing gas which is passed through the packed bed has a temperature above 1200° C.

16. The process of claim 1, wherein the packed bed includes a fluid permeable interface at an operatively downstream position relative to a region where the agglomerate is fed to the reactor, the fluid permeable interface permitting the hot reducing gas to pass therethrough and through the packed bed of agglomerates.

17. The process of claim 1, wherein the packed bed is suspended by an obstruction located in the reactor, the obstruction being at an operatively downstream position relative to the region where the agglomerate is fed to the reactor.

18. The process of claim 1, wherein the agglomerate includes a flux.

19. The process of claim 1, wherein the residence time of the metalliferous feedstock material in the packed bed of agglomerates is controlled to impact the degree of reduction of the metalliferous feedstock material in the reactor.

20. The process of claim 1, wherein the temperature of the hot reducing gas is set at a targeted temperature.

\* \* \* \* \*